(12) United States Patent
Elliott et al.

(10) Patent No.: US 8,156,379 B2
(45) Date of Patent: *Apr. 10, 2012

(54) ASSESSING COMPUTER PROGRAMS USING STACK FRAME SIGNATURES

(75) Inventors: Scott Clementson Elliott, Hillsboro, OR (US); Kenneth A. Gengler, Portland, OR (US)

(73) Assignee: Techtracker, Inc., Portland, OR (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/943,528

(22) Filed: Nov. 20, 2007

(65) Prior Publication Data

US 2008/0072213 A1    Mar. 20, 2008

Related U.S. Application Data

(63) Continuation of application No. 10/155,825, filed on May 23, 2002, now Pat. No. 7,320,125.

(60) Provisional application No. 60/293,864, filed on May 24, 2001.

(51) Int. Cl.
*G06F 11/00* (2006.01)

(52) U.S. Cl. ............. 714/38.1; 714/33; 714/37; 714/45; 717/128; 717/131

(58) Field of Classification Search .................... 714/25, 714/33, 34, 35, 37, 38, 38.1, 45, 51; 717/128, 717/131

See application file for complete search history.

(56) References Cited

U.S. PATENT DOCUMENTS

| | | | |
|---|---|---|---|
| 5,243,607 A | 9/1993 | Masson et al. | |
| 5,761,407 A | 6/1998 | Benson et al. | |
| 5,974,529 A | 10/1999 | Zumkehr et al. | |
| 6,009,258 A | 12/1999 | Elliott | |
| 6,163,858 A | 12/2000 | Bodamer | |
| 6,349,406 B1 | 2/2002 | Levine et al. | |
| 6,658,416 B1 | 12/2003 | Hussain et al. | |
| 6,662,358 B1 | 12/2003 | Berry et al. | |
| 6,732,355 B1 | 5/2004 | Ogasawara | |
| 6,857,120 B1 | 2/2005 | Arnold et al. | |
| 7,152,226 B2 | 12/2006 | Pangburn | |
| 7,320,125 B2 | 1/2008 | Elliott et al. | |
| 7,469,362 B2 | 12/2008 | Hudson et al. | |
| 7,712,082 B2 * | 5/2010 | Broman et al. | ............... 717/128 |
| 7,721,268 B2 * | 5/2010 | Loh et al. | ...................... 717/131 |
| 2002/0013825 A1 | 1/2002 | Freivald et al. | |
| 2003/0005414 A1 | 1/2003 | Elliott et al. | |
| 2003/0154464 A1 | 8/2003 | Ullmann et al. | |
| 2008/0301501 A1 | 12/2008 | Grant et al. | |

OTHER PUBLICATIONS

Office action in U.S. Appl. No. 11/943,515, mailed Feb. 26, 2010, 12 pages.

Response to Feb. 26, 2010 Office action in U.S. Appl. No. 11/943,515, dated Jun. 30, 2010, 15 pages.

Final Office action for U.S. Appl. No. 10/155,825, mailed Apr. 3, 2007, 7 pages.

(Continued)

*Primary Examiner* — Robert Beausoliel, Jr.
*Assistant Examiner* — Joseph D Manoskey
(74) *Attorney, Agent, or Firm* — Kacvinsky Daisak, PLLC (57) ABSTRACT

A method of assessing a computer program under actual working conditions according to one embodiment comprises executing the computer program multiple times under actual working conditions, in response to each unhandled exception encountered during execution of the computer program, creating a corresponding stack frame signature to characterize the state of the program, and comparing the stack frame signatures to determine which unhandled exceptions are likely to have resulted from similar features.

40 Claims, 3 Drawing Sheets

OTHER PUBLICATIONS

Third non-final Office action for U.S. Appl. No. 10/155,825, mailed Nov. 2, 2006, 6 pages.

Second non-final Office action for U.S. Appl. No. 10/155,825, mailed Jul. 3, 2006, 5 pages.

First non-final Office action for U.S. Appl. No. 10/155,825, mailed Oct. 11, 2005, 11 pages.

Software Verification Ltd, "Stack Trace Filtering," http://web.archive.org/web/20021028144510/http://www.softwareverify.com/memoryValidator/memval_filtering.html, viewed Sep. 29, 2005, 4 pages.

International Search Report for International Patent Application No. PCT/US02/16526, dated Sep. 25, 2002, 4 pages.

John D. Mitchell, "Java Tip 124: Trace Your Steps in Java 1.4," Mar. 8, 2002, published on the Internet at <http://www.javaworld.com/javatips/jw-javatip124_p.html,> 8 pages.

Dr. Carlo Pescio, "Stack Trace Exceptions in Win32," published in C/C++ *Users Journal*, vol. 16, No. 6, Jun. 1998, published on the Internet at <http://www.eptacom.net/pubblicazioni/pub_eng/except.html,> 5 pages.

Dr. Carlo Pescio, "Stack Trace Assertions Using COFF," published in C/C++ *Users Journal*, Jun. 1997, published on the Internet at <http://www.eptacorn.net/pubblicazioni/pub_eng/assert.html,> 7 pages.

\* cited by examiner

Fig. 5    ( 3 - 6 - D - 5 - F - 22 - 19 - 4 - N )
                  $\underbrace{\qquad}_{72}$ $\underbrace{\qquad}_{72}$ Fig. 6    $\overbrace{\qquad\qquad}^{72}$
          ( 6 - D - 5 - F - 22 - 19 - 4 - N - 22 - 5 - H
          = 7 - A - C - 24 - C - 24 - C - 24 - C )

ASSESSING COMPUTER PROGRAMS USING STACK FRAME SIGNATURES

RELATED APPLICATIONS

This application is a continuation of and claims priority to U.S. application Ser. No. 10/155,825, filed May 23, 2002, which in turn claims the benefit under 35 U.S.C. §119(e) to U.S. Provisional Application No. 60/293,864, filed May 24, 2001, both of which are hereby incorporated by reference in their entireties.

COPYRIGHT NOTICE

©2002 TechTracker.com, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND INFORMATION

This disclosure relates to operation of digital computers and, in particular, to the creation, collection and use of information associated with unhandled exceptions caused by one or more "bugs" in an executable program.

Unfortunately, computer programs "crash" all too often, usually for reasons that are not apparent. Despite extensive testing during development, beta testing, bug reporting procedures and the like, the reality is that even relatively mature software often contains "bugs"—the popular term for a flaw in the program code. Bugs are constantly being discovered, reported, collected, analyzed and in many cases fixed in a subsequent release, update or patch to the code. Still, in many application programs, especially complicated programs such as word processors, bugs remain that in some situations can cause a program to "crash"—the vernacular term for an unhandled exception. In other words, these are situations where an exception has occurred during execution of a program, and there is no exception handler code registered to deal with the exception. The result is that the program simply stops executing—it has crashed.

The typical response to a mysterious program crash (remonstrations aside), is to restart the failed program, and attempt to recover the user's data, sometimes by means of a backup file. Restarting the program, however, necessarily changes the state of the computer such that information about the state when the crash occurred is lost. That information might have been useful in identifying the bug that caused the crash.

Indeed, it is known in prior art to capture machine state information for use in debugging a program, or otherwise attempting to determine the cause of a crash. When a program stops executing (abnormally), this fact can be recognized and used to trigger a capture of the machine state. The current contents of RAM, processor registers, stack contents, etc. can be stored for later analysis. Sometimes an experienced, skilled artisan can study this information, like a detective at a crime scene, and discern something about the cause of the mishap. It is a difficult and labor intensive undertaking.

In the event of another crash of the same program, perhaps at another time or on another computer, there is no convenient way to determine whether the second crash might have the same or a similar etiology as the first. The detailed state of the second machine (or the same machine at the time of the second crash) will likely be quite different from the state at the time of the first crash. Only, another painstaking, detailed study of the machine state might reveal some association with the first crash. At the other extreme, it would be easy, for example, to record the program's instruction pointer value at the time of a crash, and then compare that value at the time of the second crash to see if the address is the same. This method would fail if a program's instructions were loaded at different addresses, and it is utterly context-insensitive. Even though it identifies the location where the program was executing instructions, it is unaffected by how the program got there.

Most methods concentrate on describing the crash in ways that could be meaningful to diagnose it, but ignore the usefulness of concisely characterizing it so that crash events can be categorized, collated, and studied statistically. This is not intended to aid in diagnosis per se, but it certainly could help manage such tasks. If a particular "bug" could be distinguished as being widespread, for example, it might warrant more attention than another. For this purpose, a precise description of the actual failure is not necessarily desirable. Commonly, programs crash because they tried to access a memory address that did not exist, an attribute too vague to aid categorization. Such crashes often occur within faultless code operating on defective data, so that even the actual location of the failure could be misleading.

What is needed is a way to identify or characterize a program crash, or more specifically, the current state of a computer thread at the time of a crash, that is easy to determine and recognize. It would be especially useful to have a way to describe that state so that a programmer could programmatically recognize a meaningfully similar state, whether it occurs on the same computer, a different computer, or even within a completely different program. A method that could generically characterize the instantaneous state of a thread at any arbitrary time would be more than adequate for this need, since it could therefore characterize the state of any crashed thread. It could, further, characterize the state of other non-crashed threads in the same program or other programs on the same machine, if desired for further study.

Thus, the present inventors have recognized a need to digest the call and/or data stack of an arbitrary program thread in order to generate a signature that characterizes its present state, sensitive to the path by which it reached its present state. The execution stack signature that this procedure generates is not required to concretely describe any aspect of the thread or its stack; rather the signature provides a moniker or alias that is predictably-similar when it describes threads in similar states and predictably-different when it describes threads in states.

DETAILED DESCRIPTION OF PREFERRED EMBODIMENTS

With reference to the above-listed drawings, this section describes particular embodiments and their detailed construction and operation. The embodiments described herein are set forth by way of illustration only. Those skilled in the art will recognize in light of the teachings herein that variations can be made to the embodiments described herein and that other embodiments are possible. No attempt is made to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

According to one embodiment, a method and computer program capture and describe a program's state as precisely or as generally as may be required for a particular application. For example, it may be too vague to be useful to report merely that a word processor crashed when the user inserted a page break. There may be many other circumstances that would help to distinguish or identify the particular failure. On the other hand, a complete "core dump" (to borrow an old term) would provide so much detailed information that virtually no other crash will "match" that information.

Various embodiments include the concept of a "stack signature" that is not unduly precise, yet provides an abstract indication of a program thread's current state at the time of a crash, or any arbitrary time, and how it arrived there. The "stack" is a well-known feature of most von Neumann architecture computers. There can be more than one stack, and stacks can be variously implemented in hardware registers, RAM, etc.

In one embodiment, the stack signature is derived from the entire stack, so that it reflects at least at a high level, the control flow from the start of execution of the program of interest. It is not itself a correlation technique, but a transformation whose output can be subjected to correlation techniques, both common established methods and experimental ones. It therefore enables the use of a wide range of study and examination to which a crash or other event is not intrinsically applicable. The stack signature can be simple enough for even an untrained observer to "match" or correlate one stack signature with another by inspection. For longer or more complex signatures, various correlation techniques can be used for matching or categorizing signatures.

The stack signature methodology is versatile enough that the level of precision can be adjusted even after the signature has been recorded. According to one embodiment, a method calls for tracing the program's call-stack and/or data-stack, and collecting a pattern of chosen metrics, which can include, for example, the sizes of stack frames, specific return addresses, or the general identity of the code to which those addresses belong. For example, an address can be associated with particular library. This type of information—what library was called—is an example of a "broad brush" picture of program flow; it reflects something useful about program flow, but is not unduly detailed.

Word processing programs are just one example of a type of application program that is widely used and complex enough to contain bugs that can cause the program to crash unexpectedly. The systems and methods disclosed herein are applicable to all kinds of computer programs that are executable on a von Neumann type of processor platform that implements a stack architecture. One example of such a platform is Intel's x-86 series of processors and their progeny, e.g. Pentium® microprocessors, etc.

The ability to characterize the state of a program's threads in general would be helpful to distinguish the states that an arbitrary program thread might be in when various types of failures occur. Put another way, it is desirable to be able to recognize a failure as being (probably) the same failure mode or due to the same bug when it occurs on another run or another machine. However, specific states are too specific because they will likely never match.

Program stacks are well known in computer science. A common type of stack is the call stack. A call stack generally holds a return address for returning to the calling program after the called program (or function, driver, module etc.) has completed its work, as well as a saved copy of the calling program's base pointer—i.e., a pointer to the first or "base" location on the stack associated with the calling program. The call stack can also be used to pass parameters to the callee program as is well known.

Some systems refer to the stack as beginning at the "top" and expanding "down" toward the "bottom" as more entries are pushed onto the stack. Others have the stack beginning initially at the "bottom" and expanding upward as more items are pushed onto the stack. Thus the bottom of the stack is fixed and the top of the stack moves up and down. The "current top of stack" is the next location above the last entry made (or reserved) by the currently executing module. This convention will be used in the present description, as well as the drawing figures and the appended claims. The stack convention is arbitrary, however, and the systems and methods disclosed herein are not limited to application in any particular platform or environment.

Figure 2:
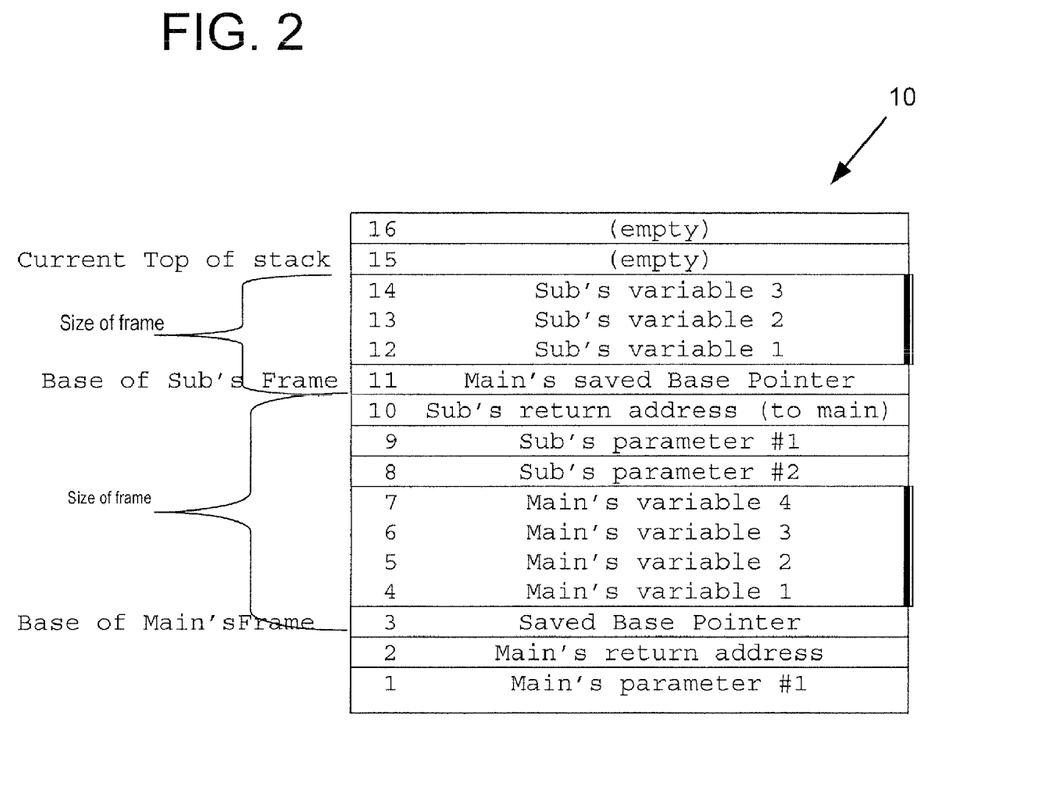
FIG. 2 is a first example of a map of a combined call stack and data stack.

Some machines also implement one or more data stacks, typically used for temporary storage of intermediate data or results. The program simply "pushes" such data onto the stack as convenient, and "pops" it off when needed. This approach is customarily used where the number of available hardware registers is quite limited, as in some microprocessors and microcontrollers. Commonly, however, the call and data stacks are combined into a single stack, as illustrated in FIG. 2. According to one embodiment, metrics from whatever stack or stacks are present are compiled, so that attributes that are predictably consistent for a particular path of execution may be found.

Stacks can be implemented in various ways, e.g. using hardware registers, random access memory, etc. Details of stack implementation are well known and beyond the scope of this disclosure. The principles of the systems and methods disclosed herein are applicable to virtually any stack implementation as will become more apparent below.

Figure 1:
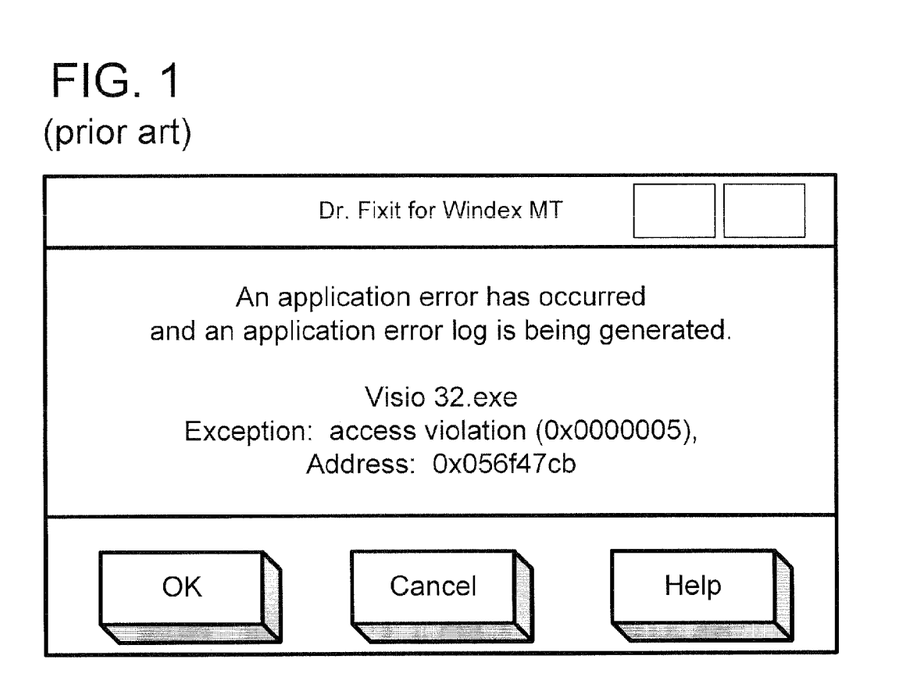
FIG. 1 is an example of an error message resulting from abnormal termination of an application program apparently due to an unhandled exception.

Often an unhandled exception results in a screen display message of the type shown in FIG. 1—sometimes called the "dreaded box of death." While the type of exception—in this example an access violation—and the address where it occurred may be useful to a developer in some cases, it says nothing about how the execution arrived at this unfortunate state. (It has also been suggested that the content of such messages is almost useless by definition, because if the operating system had useful information about the crash, it would remedy the situation.)

According to one embodiment, additional context surrounding the crash is captured, so that other crashes might be recognized as having occurred under the same or a similar context. This recognition, in turn, at least suggests that the "matching" crash might be a result of the same bug that caused the first crash (or something similar).

To achieve this, various embodiments produce a signature by tracing the thread's stack, thereby accumulating metrics which are predictably-consistent artifacts of the program's behavior. These artifacts needn't be deliberate, nor is it necessary that they be individually distinctive. Accumulating these metrics together in combination establishes the uniqueness of each signature, and the uniqueness is made more robust if it is sensitive to the ordering of these metrics.

One simple metric that yields robust signatures is the distance between adjacent stack frames (essentially the "size" of each frame). A typical program function declares a stack frame for itself immediately upon being invoked, always declaring as much space as it might need. While this quantity is doubtless not individually unique, it is consistent for every invocation of that particular function, and so it meets our criteria and helps form a robust signature by accumulation.

The representation of the signature offers opportunities for enhancement. If we will only be interested in exact matches, we could form a signature by simply appending the metrics together and hashing it to form a fixed-length checksum; this method would be about as robust as the chosen hashing function, which could be as simple as a CRC32 or as sophisticated as a SHA-1. To enable more sophisticated analysis, we can transform the ordered list into a string. There exist many elaborate and powerful string-collation and analysis techniques, and this transformation would enable us to exploit them instead of devising our own.

Referring now to FIG. 2, a simple example of a combined stack 10 is shown, extending over locations 1 to 16. This type of arrangement is similar to that found in an Intel platform, for example, where the Intel CPU has a register called the Extended Base Pointer ("EBP") that points to the current top of the stack. In the Intel stack, the top element contains the EBP for the previous stack frame. Referring again to FIG. 2, starting from the top of the stack, a first frame is employed by function "Sub." The first frame extends from location 14 to location 11. Location 11 saves the previous or calling function's (here, "Main") base pointer.

The top of the next frame is location 10; it stores the return address provided by the calling program Main. This second frame extends from location 10 to location 3, where it stores a saved base pointer. Location 2 has Main's return address and so on. The first and second stack frames (measured from the top) are 4 and 8 cells apart, respectively. The distance between one stack frame and the next is the sum of all the items pushed onto the stack between nested function calls. A simple way to describe this stack, or portion of a stack, is an ordered list, in this case "4-8" indicating two adjacent frames, having sizes 4 and 8 respectively. Enclosing the string in delimiters, like parentheses, permits the ends of the stack to be clearly denoted. For this example, the string would then read "(4-8)." The same principle is easily applied to a program with more and larger stack frames. For example, such an ordered list might be "(280-312-242-4-728-449-233-18-385)." These kinds of ordered lists are examples of slack-frame signatures according to various embodiments. As the reader can see, these are relatively easy to create and to compare to one another. Stack frame signatures are not limited to a list of frame sizes. Additional information can be useful, but what is important here is to be sensitive to attributes influenced by the thread's execution path yet insensitive to other influences like the contents of specific variables, quantity of free memory, or the current date & time. To illustrate, a stack trace can be used to collect return addresses, but that specific information is excessively precise for present purposes. The sane program, executing at another time or on another machine, may load program modules at arbitrarily different locations so that the program may not traverse the same addresses even if it executes the same sequence of instructions. Consequently, a stack frame signature comprising return addresses will likely not find a match, even when comparing runs that executed completely identical paths of instructions. Similarly, recording the value of the instruction pointer at the time of failure will not help where instructions are loaded at different addresses, and in any event, this value is unaffected by how the program arrived there; it provides no historical context.

Return addresses, however, can be used to identify a module (library, executable, or other code file) to which the calling code belongs. The actual numerical addresses are ephemeral, again because each time the program is loaded, those numbers may change. Module locations may change or they simply might not be known at a later time. But the address is meaningful at the time of its discovery because it refers to a location, probably a code module, at which the program eventually expected to continue execution. It can consequently be used to identify the module to which that address refers. This can be obtained, for example in Microsoft Windows OS, by a system call, providing the address as an argument. The identity or type of module can be used to determine whether or not to include the metrics of a particular frame (call) in a stack frame signature. If we do not want our signature to sense differences solely attributable to different versions of the operating system, for example, we could first identify each module as described above, and censor from the signature any information associated with modules provided by the operating system. This is optional, though, as it is just as valid to regard as significant all attributes of all frames.

Figure 4:
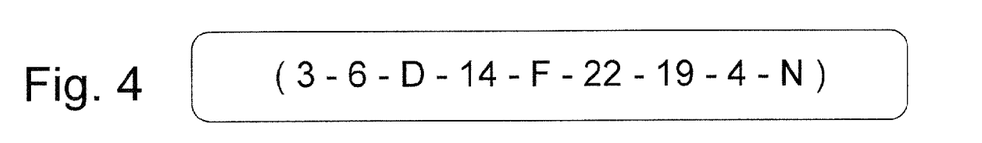
FIG. 4 is a first example of a stack frame signature.

To illustrate, FIG. 4 shows a simple stack frame signature. The parentheses delimit the ends of the stack. In this example, the frame sizes are encoded using base 36 simply to make the data structure more compact and easier to inspect. Nine frames are represented. Next we compare the frame signature of FIG. 5 to that of FIG. 4. Assume that these signatures reflect crashes of the same application program on two different computers. The two signatures are identical except for the fourth symbol, which has the value "14" in FIGS. 4 and 5 in FIG. 5. If it were determined, for example, that the fourth symbol (frame) was a call to a video board, the difference in frame sizes might be attributed to the software on the two video boards, which may be from different vendors. That frame size has nothing to do with the application program under study. So by identifying the general type or library of a given module, one can choose whether or not to include it in the frame signature. Here, where we want to recognize similar failure modes of the application program, omission of the fourth symbol would leave signatures that match, That symbol (frame size) could simply be omitted from the signature; or it could be replaced by a generic symbol, as a frame place holder that would allow the signatures to match.

Figure 7:
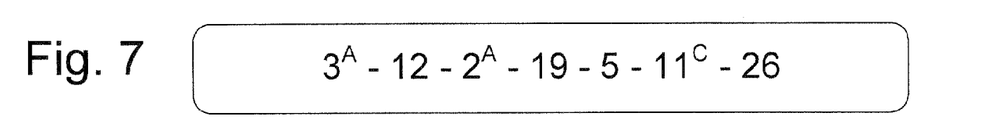
FIG. 7 is a fourth example of a stack frame signature.

In other situations, it may be useful for categorizing failures to know the identity or type of module called in each frame. This information can be included in the frame signature. For example, suppose there are code libraries A, B and C loaded. A stack frame signature can be constructed as illustrated in FIG. 7 where each symbol, indicating the corresponding frame size, also includes another symbol, here the superscripts "A" and "C," indicating the corresponding module library. The symbols without superscripts can indicate calls to functions within the application program under study. The reader will by now appreciate that such signatures can easily be compared and examined to identify patterns or common characteristics.

Figures 5, 6:
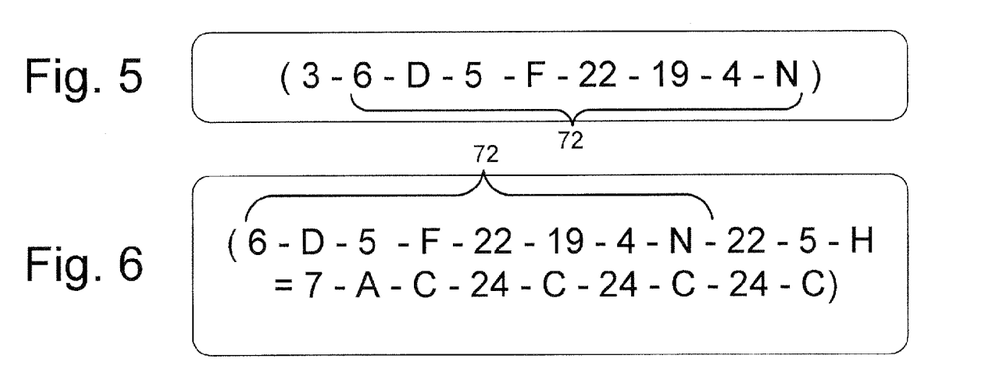
FIG. 5 is a second example of a stack frame signature.
FIG. 6 is a third example of a stack frame signature.

FIG. 6 illustrates additional features and potential applications of stack frame signatures. Here, a portion (substring) 72 of the signature matches a substring of the signature of FIG. 5. In the case of FIG. 5, the program crashed at the end of that string, in the frame having length "N" (assuming the signature string runs from bottom to top of stack). In FIG. 6, the same substring 72 appears, but the program continued to execute thereafter (for another dozen frames). More user data, in other words signatures of scores or even hundreds of other crashes of the same program can be compared to help determine the implications of this difference. For example, if 98% of a larger sample of signatures match the substring of FIG. 5 but not the longer signature of FIG. 6 different conclusions may be drawn.

FIG. 6 also illustrates other features. First, the connector between the symbols H and 7, i.e., the equal sign, differs from the other connectors and is used here to signify a break in the stack trace or stack frame chain. This is further discussed below. The other notable feature of FIG. 6 is the repeating sequence "C-24-C-24-C-24" etc. This type of repeating pattern can reflect a program logic loop or a recursion failure mode in which a module keeps calling itself recursively, and declaring more stack space, until it runs out of space. Such patterns are easy to recognize and to match.

Figure 3:
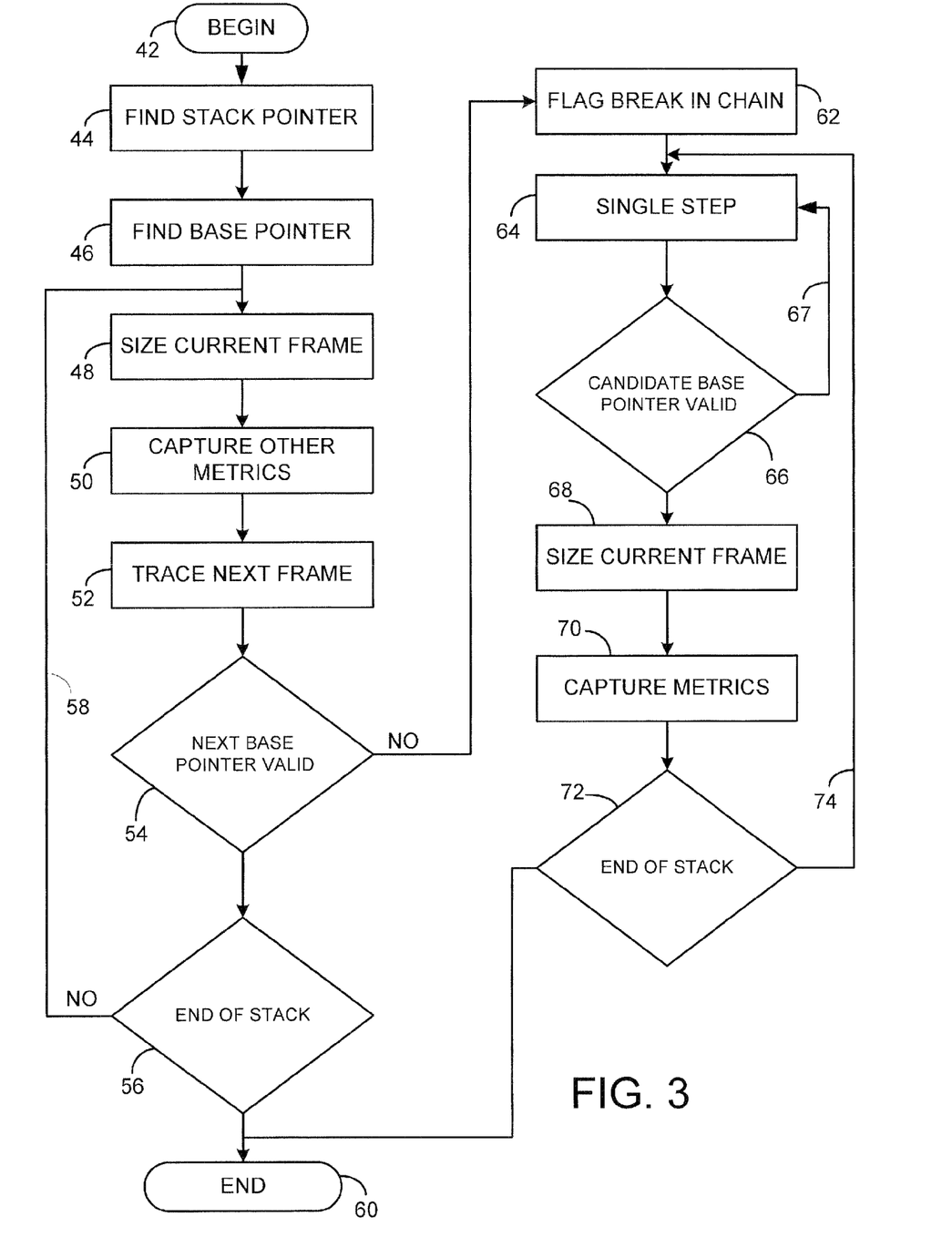
FIG. 3 is a flow chart illustrating a method of generating a stack frame signature.

FIG. 3 is a flow chart illustrating a method of forming a frame stack signature associated with a particular program thread according to one embodiment. Referring to FIG. 3, the method begins at step 42 where the systems and methods disclosed herein are invoked. It can be called at any time to capture a stack frame signature. One way to implement the systems and methods disclosed herein is as an enhancement to a pre-existing "debugger" program. Alternatively, it can be implemented stand-alone or integrated with other tools. In a preferred embodiment, the systems and methods disclosed herein are implemented in executable code that is registered with the target operating system so that the operating system will launch the stack signature program ("SSP") responsive to abnormal termination of an application program. In step 44, the SSP finds the stack pointer, indicating the current top of stack. Next it finds the base pointer in the current frame, step 46, which can be done using known stack trace methods. From these pointers, or similar stack trace tools, the size of the current stack is determined in step 48. This datum can form the first item in the signature as illustrated above.

Other metrics are captured, optionally, in step 50. These can include, for example, the current frame module name, type or library. Indicia responsive to such additional metrics can be included in the signature data. As mentioned above, such further metrics can also be used to modify or filter the signature data, for example with regard to calls to drivers or other modules that may be irrelevant for present purposes.

Referring again to FIG. 3, step 52 calls for tracing the next frame, by which we mean at least locating the next base pointer. In decision block 54 we check whether the next base pointer is valid. For example, does it point to another location on the stack (valid), or does it contain zero or point somewhere else (invalid). If it is valid, test for end of stack 56, and if true, return 60.

If the next base pointer is invalid at test 54, there is a break in the chain of stack frames. This can occur, for example, where a function call did not adhere to standard or customary programming practices with regard to the stack. The present method will then single step to the next stack location (proceeding top to bottom in this illustration), step 64, and test 66 whether that location contains a valid base pointer. If not, we single step to the next location, loop 67, and so on until we find the next valid pointer. That defines the next frame for present purposes, and we determine its size in step 68. Again, other metrics about this frame can be captured as well, step 70, such as the identity of its library or the general type of function, Still referring to FIG. 3, we again test for end-of-stack, step 72, and if true return 60. If this is not the bottom frame in the stack, we loop back to continue to process, preferably until we parse through the entire stack.

Of course, some stacks may be quite long. This is not necessarily a problem, and long signatures can be used, but the relevance of lower (older) frames in a long stack with regard to the ultimate failure of the subject program may be attenuated or null. Accordingly, one could choose to truncate a stack frame signature to some arbitrary length, at the risk of losing some potentially useful information. Whatever method is employed to truncate, it must be predictable so that the truncation of identical signatures does not yield differing results. A simple, effective method would be to retain fixed-length excerpts of the starting and ending portions of the signature, two areas likely to be of interest. If we intend to employ the signature to test only for exact matches, we could hash it to a fixed-length checksum, so that the significance of the length of the intermediate data is how it impacts the final checksum.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A computer-implemented method, comprising:
   tracing by a processor a call stack for an executed program;
   generating a selected metric for each stack frame in the call stack;
   encoding each selected metric into a corresponding symbol; and
   assembling the encoded symbols into an ordered list to form a stack frame signature with a historical execution path of the executed program.

2. A computer-implemented method according to claim 1, wherein the selected metric comprises a length of each of the stack frames.

3. A computer-implemented method according to claim 2, wherein the step of encoding each selected metric into a corresponding symbol comprises encoding the length of each of the stack frames in a positional notation system of the form base b, wherein b is greater than 2.

4. A computer-implemented method according to claim 3, wherein b is equal to 36 so that each symbol can be represented using a single Arabic numeral or a single Latin letter.

5. A computer-implemented method according to claim 1, wherein the selected metric comprises an identifier of a generic type of callee module corresponding to each of the stack frames.

6. A computer-implemented method according to claim 1, wherein the selected metric comprises an identifier of a specific callee code module corresponding to each of the stack frames.

7. A computer-implemented method according to claim 1, wherein the selected metric comprises an identifier of a callee library associated with each of the stack frames.

8. A computer-implemented method according to claim 1, wherein the selected metric comprises an indication of a system call applicable to each of the stack frames.

9. A computer-implemented method according to claim 1, wherein the selected metric comprises an indication of a peripheral driver module call applicable to each of the stack frames.

10. A computer-implemented method according to claim 1, further comprising:

delimiting the series of encoded symbols so as to indicate the start and the end of the call stack.

11. A computer-implemented method according to claim 1, further comprising:
filtering the stack frame signature by deleting symbols corresponding to stack frames associated with predetermined callee code modules.

12. A computer-implemented method according to claim 1, further comprising:
filtering the stack frame signature by deleting symbols corresponding to stack frames associated with selected types of modules.

13. A computer-implemented method according to claim 1, further comprising:
filtering the stack frame signature by deleting symbols corresponding to stack frames associated with system calls.

14. A computer-implemented method according to claim 1, further comprising:
filtering the stack frame signature by deleting symbols corresponding to stack frames associated with calls to peripheral drivers.

15. A computer-implemented method according to claim 1, further comprising:
truncating the stack frame signature so as to preserve only a selected portion of the signature.

16. A computer-implemented method according to claim 1, wherein said encoding includes transforming the captured metric into a representation that is more compact than a binary representation, thereby facilitating human inspection and recognition of the stack frame signature.

17. A computer-implemented method according to claim 1, wherein the stack frame signature formed by the step of assembling the series of encoded symbols into an ordered list does not comprise specific address information.

18. A computer-implemented method according to claim 1, wherein the selected metric is a first selected metric, the method further comprising:
capturing a second selected metric with respect to each stack frame in the series, the second selected metric being different from the first selected metric;
encoding the second captured metric into a corresponding second symbol; and
appending the encoded second symbols to corresponding ones of the series of encoded symbols such that the stack frame signature reflects two captured metrics with respect to each stack frame in the series.

19. A computer-readable non-transitory storage medium on which is stored a stack signature program for capturing and describing the state of an application program under actual working conditions, the stack signature program being registered with a target operating system that launches the stack signature program responsive to abnormal termination of the application program, the stack signature program comprising instructions that when executed cause a computing system to:
trace a call stack for an executed program;
generate a selected metric for each stack frame in the call stack;
encode each selected metric into a corresponding symbol; and
assemble the encoded symbols into an ordered list to form a stack frame signature with a historical execution path of the executed program.

20. The storage medium of claim 19, wherein the selected metric comprises a length of each of the stack frames.

21. The storage medium of claim 20, further comprising instructions that when executed cause the computing system to encode the length of each of the stack frames in a positional notation system of the form base b, wherein b is greater than 2.

22. The storage medium of claim 21, wherein b is equal to 36 so that each symbol can be represented using a single Arabic numeral or a single Latin letter.

23. The storage medium of claim 19, wherein the selected metric comprises an identifier of a generic type of callee module corresponding to each of the stack frames.

24. The storage medium of claim 19, wherein the selected metric comprises an identifier of a specific callee code module corresponding to each of the stack frames.

25. The storage medium of claim 19, wherein the selected metric comprises an identifier of a callee library associated with each of the stack frames.

26. The storage medium of claim 19, wherein the selected metric comprises an indication of a system call applicable to each of the stack frames.

27. The storage medium of claim 19, wherein the selected metric comprises an indication of a peripheral driver module call applicable to each of the stack frames.

28. The storage medium of claim 19, further comprising instructions that when executed cause the computing system to:
delimit the series of encoded symbols so as to indicate the start and the end of the call stack.

29. The storage medium of claim 19, further comprising instructions that when executed cause the computing system to:
filter the stack frame signature by deleting symbols corresponding to stack frames associated with predetermined callee code modules.

30. The storage medium of claim 19, further comprising instructions that when executed cause the computing system to:
filter the stack frame signature by deleting symbols corresponding to stack frames associated with selected types of modules.

31. The storage medium of claim 19, further comprising instructions that when executed cause the computing system to:
filter the stack frame signature by deleting symbols corresponding to stack frames associated with system calls.

32. The storage medium of claim 19, further comprising instructions that when executed cause the computing system to:
filter the stack frame signature by deleting symbols corresponding to stack frames associated with calls to peripheral drivers.

33. The storage medium of claim 19, further comprising instructions that when executed cause the computing system to:
truncate the stack frame signature so as to preserve only a selected portion of the signature.

34. The storage medium of claim 19, further comprising instructions that when executed cause the computing system to:
transform the captured metric into a representation that is more compact than a binary representation, thereby facilitating human inspection and recognition of the stack frame signature.

35. The storage medium of claim 19, wherein the stack frame does not comprise specific address information.

36. The storage medium of claim 19, wherein the selected metric is a first selected metric, the storage medium further comprising instructions that when executed cause the computing system to:

capture a second selected metric with respect to each stack frame in the series, the second selected metric being different from the first selected metric;

encode the second captured metric into a corresponding second symbol; and append the encoded second symbols to corresponding ones of the series of encoded symbols such that the stack frame signature reflects two captured metrics with respect to each stack frame in the series.

37. An apparatus, comprising:

a processor; and a memory coupled to the processor, the memory to store a computer program to generate stack signatures that when executed by the processor is operative to trace a call stack for an executed program, generate a selected metric for each stack frame in the call stack, encode each selected metric into a corresponding symbol, and assemble the encoded symbols into an ordered list to form a stack frame signature with a historical execution path of the executed program.

38. The apparatus of claim 27, the selected metric comprising a length of each of the stack frames.

39. The apparatus of claim 27, the computer program operative to encode the length of each of the stack frames in a positional notation system of the form base b, wherein b is greater than 2.

40. The apparatus of claim 27, wherein b is equal to 36 so that each symbol can be represented using a single Arabic numeral or a single Latin letter.

* * * * *